United States Patent [19]

Stevenson, III

[11] 3,961,163
[45] June 1, 1976

[54] PROGRAMMABLE DIGITAL/ANALOG MEMORY SYSTEM

[76] Inventor: Clarence H. Stevenson, III, 303 W. Glenoaks Blvd., Glendale, Calif. 91202

[22] Filed: Apr. 10, 1975

[21] Appl. No.: 566,669

Related U.S. Application Data

[60] Division of Ser. No. 407,433, Oct. 18, 1973, Pat. No. 3,915,851, which is a continuation of Ser. No. 334,210, Feb. 21, 1973, abandoned.

[52] U.S. Cl. ........................................ 235/61.11 A
[51] Int. Cl.$^2$ ........................................ G06K 7/06
[58] Field of Search .......... 340/147 P; 200/DIG. 29, 200/1 R, 46; 74/568 FS, 568 T, 568 M, 1 R; 214/11 C, 11 R; 235/61.11 A, 61.11 R

[56] References Cited

UNITED STATES PATENTS

| | | | |
|---|---|---|---|
| 1,771,905 | 7/1930 | Uher, Jr. | 200/DIG. 29 |
| 3,057,224 | 10/1962 | Svaty et al. | 74/568 M |
| 3,160,729 | 12/1964 | Lapham | 200/153 |
| 3,274,852 | 9/1966 | Ebbert | 74/568 |
| 3,354,434 | 11/1967 | Shlesinger, Jr. | 340/147 |
| 3,491,718 | 1/1970 | Ebbert et al. | 118/2 |
| 3,593,586 | 7/1971 | Dunigan | 74/1 R |
| 3,687,362 | 8/1972 | Del Rosso | 235/98 R |

*Primary Examiner*—Daryl W. Cook
*Attorney, Agent, or Firm*—Christie, Parker & Hale

[57] ABSTRACT

A programmable digital/analog memory can be used as a control system to sort different articles, travelling on an indexing type product conveyor by removing each particular type of article from the conveyor and storing it in a respective preselected storage lane adjacent the conveyor. The control system includes a control panel, and a series of memory bands below a matrix board on the control panel. Each memory band corresponds to a different type of article to be sorted. The control system also includes a drive system synchronous with movement of the indexing conveyor for moving the memory bands relative to the matrix board in steps corresponding to the successive forward strokes of the conveyor. Each memory band is coded at certain information storage locations representing the positions of corresponding articles travelling on the conveyor. A series of probes plugged into certain locations on a matrix board adjacent the memory bands select which storage lanes are to receive each type of article. A separate control circuit couples each probe with a corresponding transfer mechanism for moving articles from the conveyor onto the particular storage lane with which the probe is associated. The coded storage locations of each memory belt move into engagement with a given one of the probes when the articles associated with the memory band reach their preselected storage lane. The probe acts as a decoding device by completing its respective control circuit to actuate the transfer mechanism which then moves each article onto the preselected storage lane.

12 Claims, 10 Drawing Figures

PROGRAMMABLE DIGITAL/ANALOG MEMORY SYSTEM

A CROSS-REFERENCE TO RELATED APPLICATIONS

This is a division of application Ser. No. 407,433, filed Oct. 18, 1973, now U.S. Pat. No. 3,915,851, which, in turn, is a continuation of application Ser. No. 334,210 filed Feb. 21, 1973, now abandoned.

BACKGROUND OF THE INVENTION

This invention relates to a digital memory system for controlling the sorting of articles.

In various production plants today, a variety of products are produced on separate production lines, and the products are then fed onto a common conveyor which delivers the products to a storage area where they accumulate prior to being loaded onto trucks and shipped. In a dairy plant, for example, a series of product-filling machines fill cartons with various products such as milk, buttermilk, cottage cheese, and the like. Each machine discharges stacks of cases filled with separately identifiable products onto a common conveyor which transfers the stacks off cases in a random order from the filling area to a cold storage room where they are removed from the conveyor. Generally, the cases are sorted into groups of like products in the storage area in preparation for shipping.

In the past, products delivered to the storage area have been removed from the conveyor and sorted manually, but this method is too time consuming and costly because it requires an inordinately large expenditure of man-hours, it also requires considerable supervision, and it is seriously lacking in inventory control.

Due to recent developments, dairy plants and other production plants are being equipped with systems for automatically sorting products delivered in a random order to a storage area on a single conveyor from a production area. Generally, such systems include a lug-type indexing conveyor for delivering products from the production area to the storage area, and separate side-by-side storage lanes located in the storage area adjacent the indexing conveyor. Products are sorted as they travel along the lug conveyor and are transferred onto respective preselected storage lanes.

A lug-type indexing conveyor is a recent development in the art, and generally includes a track along which the cases move, and a longitudinally reciprocating carriage below the track for pushing the cases along the track. Pusher lugs are spaced apart along the length of the carriage, and each lug pushes a given stack of cases one step to a position in front of the next lug during each forward stroke of the conveyor carriage. Thus, the stacks of cases move one step at a time along the conveyor track during each reciprocation of the carriage.

Generally speaking, products of a given type are sorted and automatically transferred from the indexing conveyor at predetermined storage lanes where they accumulate prior to being shipped. A common prior art sorting method is the direct coding of the articles for read-out at a subsequent storage station. This method includes a separate code applicator system at each product entrance station on the lug conveyor, and a code reader at each storage lane. Such a method includes coding with glass beads, or soap foam spots, and retroreflective (electric eye) systems for reading the codes at each storage lane. Other methods include direct contact readers, such as electrodes for sensing soap foam spots or the like on each stack of cases. The disadvantage of these systems is that the equipment is costly to install and maintain, particularly for large installations containing numerous product filler stations and a multitude of storage lanes, such as in a dairy plant. Moreover, many product-containing receptacles or cases, particularly milk cases, vary in size or configuration, which makes it especially difficult to directly code and read them accurately. Some cases are made of steel wire and leave no surface for coding with conventional or known means.

SUMMARY OF THE INVENTION

This invention provides a programmable digital-/analog memory system for controlling the sorting of articles travelling on a conveyor. The system is especially suitable for sorting articles travelling on an indexing type conveyor. The system overcomes the disadvantages of direct coding systems, because it can handle sorting for a relatively large production plant with a relatively small amount of inexpensive equipment. A major advantage is that this system does not require code applicators to be located at each product entry station, or code read-out equipment to be physically located at each storage station. Accordingly, installation and maintenance costs for this system are substantially lower than in direct coding systems while reliability is substantially improved.

Briefly, the control system includes a series of memory bands, each of which is associated with a corresponding product input station feeding articles onto a conveyor. Indexing means move the memory bands one step for a given length of conveyor travel. Each memory band may be coded with an information bit at a location on the band representing the position of a corresponding article travelling on the conveyor. A series of probes, in which each probe corresponds to a respective storage area, are adapted to be selectively positioned in certain locations relative to the memory bands to represent the particular storage areas where the articles associated with the coded memory bands are to be stored. A separate control circuit couples each probe with a corresponding system for transferring articles from the conveyor to the particular storage area associated with the probe. Each coded memory band ultimately moves its information bit into cooperation with one of the probes when the article associated with the coded memory band arrives at its preselected storage area. The probe acts as a decoding device to complete the control circuit between the probe and the transfer device associated with the storage area to actuate the transfer device and move the article to its storage area.

Thus, the control system automatically senses when articles are fed onto a product feed conveyor from numerous input stations. It keeps track of each product on the conveyor until each product reaches the area or conveyor where it is to be stored. The system then generates a signal to actuate a transfer mechanism when each product reaches its predesignated storage area. The control system is capable of being easily programmed and reprogrammed several times per day, if need be, by nontechnically trained operators with relatively little instruction. The system is relatively simple to maintain and easily understood by non-electronically trained personnel. It is relatively inexpensive in terms of equipment and installation cost, and yet, has the capability of handling very complex sorting and storage systems. Moreover, the system is especially adapted to be interfaced with computers for inventory record keeping, or other data keeping systems for printing records relating to the number, or quantity, of products stored, and the location where each product is stored.

BRIEF DESCRIPTION OF THE DRAWINGS

These and other aspects of the invention will be more fully understood by referring to the following detailed description and the accompanying drawings in which.

DETAILED DESCRIPTION OF THE PREFERRED EMBODIMENTS

Figure 1:
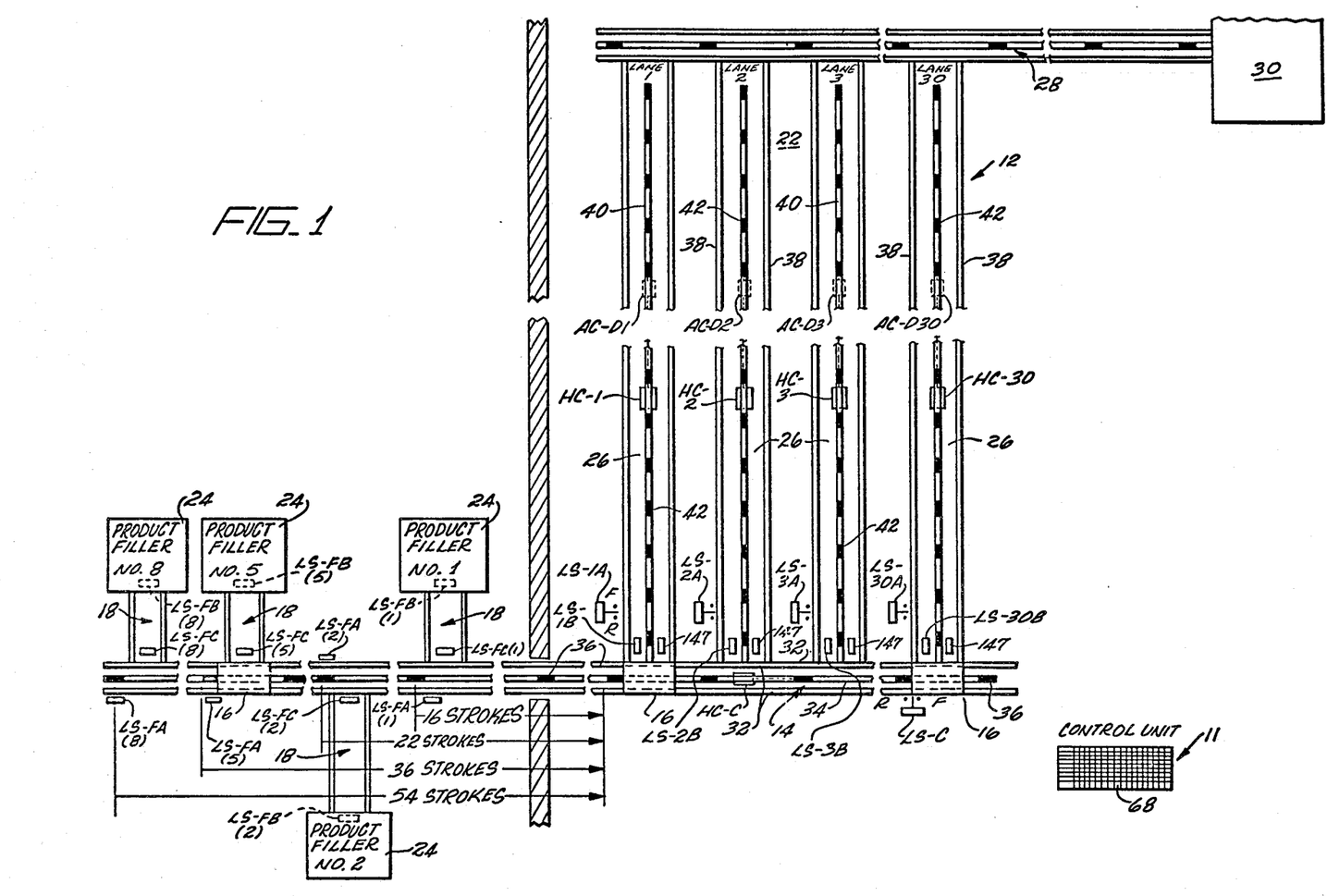
FIG. 1 is a fragmentary schematic plan view of a dairy plant having a lug-type feed indexing conveyor and an articlesorting system according to this invention.

Referring to FIG. 1, a control unit or programming unit 11 houses a digital memory system according to this invention for controlling the sorting of articles for temporary storage in a production plant. The digital memory control system will be described in the context of controlling the sorting of articles in a dairy cooler or holding box 12. However, it should be understood that the control system can sort products in other types of production plants, warehouses, or freight terminals without departing from the scope of the invention.

Dairy plant cooler box 12 includes a crossfeed conveyor 14 for transporting stacks of cases 16 containing dairy products from a series of production line tracks 18 in a product filler area 20 to a production storage area 22 in a cold storage room of the plant. Several product filling machines 24 are located in product filler area 20. Eight such machines are illustrated schematically in FIG. 1. Each machine discharges stacks of milk cases filled with separately identifiable dairy products, such as homogenized milk, non-fat milk, buttermilk, cottage cheese, and the like, onto corresponding production lines 18.

Storage area 22 includes any required number of side-by-side storage conveyors or storage lanes 26 aligned perpendicular to crossfeed conveyor 14. The dairy plant illustrated in the drawings has thirty separate storage lanes, although substantially more storage lanes may be used in a large dairy plant. Each stack of cases carried on crossfeed conveyor 14 is moved onto a preselected one of the storage lanes 26 by an indexing and sorting system controlled by control unit 10 and described in greater detail below. Preferably, each storage conveyor 26 accumulates cases containing only one type of product. Thus, a workman in the plant can readily ascertain the locations and numbers of cases containing a given product. When orders for a shipment lot are received, cases are moved from their corresponding storage lanes onto a discharge conveyor 28 extending along the discharge ends of storage conveyors 26. The discharge conveyor advances the shipment lot to a shipping area 30 where the cases are loaded onto trucks.

Crossfeed conveyor 14 preferably is a lug-type indexing conveyor, and each storage conveyor 26 preferably is a lug-type accumulating conveyor. Both of these conveyors are recent developments in the art. Briefly, crossfeed conveyor 14 includes a pair of longitudinally extending and parallel rails 32 forming a track for supporting cases 16 which slide lengthwise along the track during operation of the conveyor. A reciprocating conveyor carriage disposed between rails 32 includes a longitudinally extending and parallel, upwardly opening channel bar 34, and a hydraulic cylinder HC-C for longitudinally reciprocating the conveyor carriage. A series of pusher lugs represented schematically at 36 are pivotally mounted on channel bar 34 at intervals corresponding to spacing of storage conveyors 26. Preferably, the lugs and the storage conveyors are longitudinally spaced apart by a distance slightly greater than the length of a stack of cases. The conveyor carriage also includes a suitable mechanism (not shown) for holding the lugs in a raised position when the conveyor is moving forward so they will engage a stack of cases in front of them on the conveyor track and push the stack forward one step, or index, for each forward stroke of conveyor carriage 34. Lugs then drop below the stacks as the conveyor reciprocates back to its rear position.

Storage conveyors 26 are similar in construction to crossfeed conveyor 14. Each storage conveyor includes a track formed by parallel rails 38 for supporting and guiding stacks of cases, and a single reciprocating carriage between each track. Each reciprocating carriage includes a channel bar 40, a series of pusher lugs 42 on the channel bar spaced apart by a distance slightly greater than the width of a stack of cases, and a separate hydraulic cylinder for each lane, HC-1 for lane no. 1, HC-2 for lane no. 2, and so forth. Each storage conveyor also includes a suitable mechanism for raising the pusher lugs to hold them in their operative positions so they can push a stack of cases one space for each forward stroke of conveyor carriage 40. Preferably each conveyor carriage also includes a sensing mechanism (not shown), which is a recent development in the art, for determining when a space ahead of a given pusher lug is occupied so it can prevent the lug from pushing an object into an occupied space. Such a sensing mechanism generally allows the carriage to accumulate objects end-to-end along the length of the track until the track is completely filled.

The tracks 18 leading from filling machines 24 are spaced apart by distances corresponding to a whole number of indexes of crossfeed conveyor 14. Thus, each stack of cases on a given track 18 will be discharged onto crossfeed conveyor 14 between adjacent pusher lugs, but only when there is an empty space on the crossfeed conveyor to receive the stack. This method of control will be described in detail below.

Each filling machine 24 and its associated track 18 also are located a whole number of full strokes of the crossfeed conveyor away from storage lane no. 1, which is always the reference point with respect to movement of the cases along the crossfeed conveyor. For example, with storage lane no. 1 being the reference point, FIG. 1 illustrates that product filler no. 1 in this example is located exactly sixteen strokes away from storage lane no. 1, filler station no. 2 is located twenty-two strokes from storage lane no. 1, and so forth. The thirty storage lanes 26 in this example are spaced apart by a distance equivalent to one stroke of the crossfeed conveyor lugs. Thus, assuming that a stack of cases discharged from product filler no. 8 is to be stored at storage lane no. 12, fifty-four strokes of the crossfeed conveyor will move the stack to lane no. 1, and an additional eleven strokes will move the stack to lane no. 12 where it will be stored.

As will become clear from the discussion below, the digital memory sorting system of this invention allows an operator to select which storage lane or lanes are to receive a given product. The system then automatically keeps track of each product as it moves the product along the crossfeed conveyor, and automatically generates an output signal when each product on the crossfeed conveyor reaches its preselected storage lane. The output signal then actuates a transfer mechanism 44 (shown in FIGS. 5 and 6) at the receiving end of the designated storage lane. The transfer mechanism automatically pulls the stack onto the first storage space of the designated storage lane. Therefore, articles travelling in random order along the crossfeed conveyor are automatically sorted and stored in accordance with any desired, easily changed, preselected plan.

Figure 5:
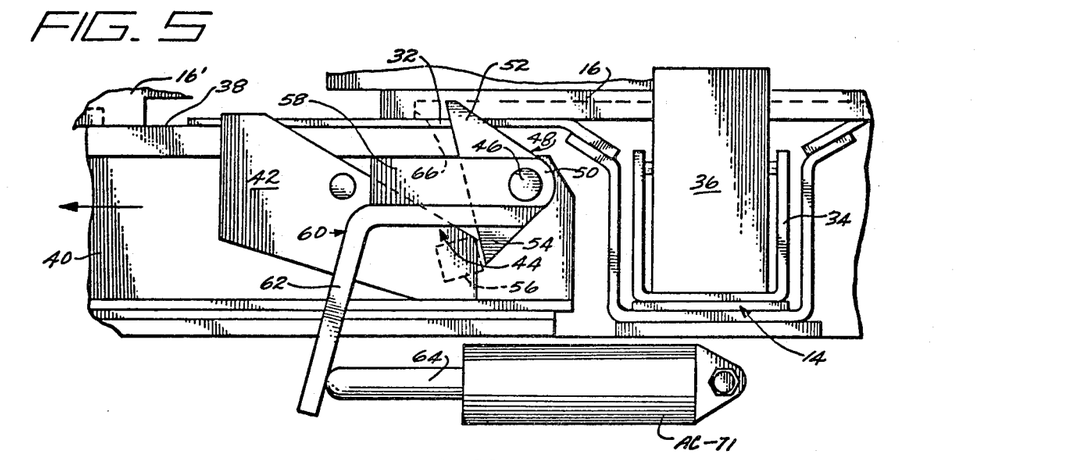
FIG. 5 is a fragmentary elevation view showing an indexing feed conveyor at the entry end of a storage conveyor lane, and a transfer mechanism for moving objects from the feed conveyor onto the storage lane.
Figure 6:
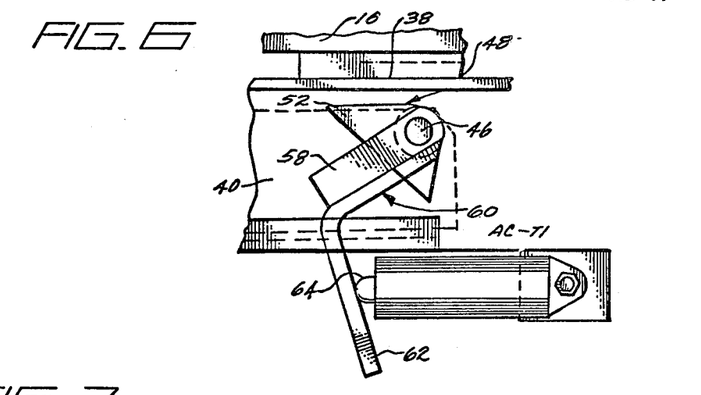
FIG. 6 is a fragmentary elevation view showing the inoperative position of the transfer mechanism of FIG. 5.

A separate transfer mechanism 44 is located at the receiving end of each storage lane for pulling stacks of cases onto the storage lanes. (Transfer mechanisms 44 are not shown in FIG. 1 for clarity.) The operation of a typical transfer mechanism will be understood best by referring to FIGS. 5 and 6. The transfer mechanism includes a transverse rotary shaft 46 supported by the side walls of carriage channel 40 of the storage conveyor. A pair of right and left transfer lugs 48 are carried on outer ends of shaft 46 adjacent the outer side walls of channel 40. (Only one of the transfer lugs 48 is shown in FIGS. 5 and 6.) Each transfer lug has a wide central portion 50 mounted on shaft 46, a pointed nose 52 adapted to be raised above storage conveyor track 38 (as shown in FIG. 5), and a pointed tail 54. A pair of outwardly extending right and left lug rotation stops 56 (only one of which is shown in FIG. 5) are welded to the outer edges of the side walls of channel 40. The stops are positioned so that the tails of the right and left transfer lugs abut against the stops when the lugs are rotated to their nose-up positions. The stops hold the lugs in a fixed nose-up position while they pull objects onto storage lane 26 during use.

A transfer lug rotation assembly mounted at one end of shaft 46 includes a rectangularly shaped counterweight 58 rigidly secured to the end of shaft 46 so as to rotate with the shaft, and a substantially L-shaped rotation arm 60 rigidly secured to the counterweight so it also rotates with the shaft. Rotation arm 60 has a downwardly projecting leg 62 engaged with a linearly reciprocating piston arm 64 of an air cylinder designated AC-T1 for storage lane no. 1, AC-T2 for storage lane no. 2, and so forth. Air cylinder AC-T1 is disposed below rotation arm 60, and when piston arm 64 is in its extended position (shown in FIG. 5), it forces leg 62 forward to pivot transfer lugs 48 to their nose-up positions so their noses extend above track 38. When the piston arm is retracted, the nose-heavy rotation arm drops to its nose-down position under the influence of counterweight 58 to thereby pivot noses 52 of the transfer lugs below conveyor track 38, as shown in FIG. 6.

In use, transfer lugs 48 pull objects from crossfeed conveyor 14 onto the storage lane track 38 with which they are associated. When an object 16 on the crossfeed conveyor track 32 reaches the entrance of its preselected storage lane, the transfer air cylinder AC-T1 (for lane no. 1) is energized, by a control system described below, to extend its piston arm 64 and thereby rotate transfer lugs 48 into their nose-up position shown in FIG. 5. The storage conveyor carriage channels 40 are then reciprocated forward in the direction of the arrow shown in FIG. 5 so the forward stroke of the conveyor carriage will cause the transfer lugs to grip a front lip 66 of the object at the entrance of the storage lane and pull the object (or stack of objects) onto the storage conveyor track. FIG. 5 shows another object 16' located in the space immediately in front of the object being transferred onto the storage lane. In this instance, the forwardmost pusher lug 42 of the storage conveyor reciprocates forward in unison with transfer lugs 48 to push object 16' into the next space on the storage conveyor track, and thereby made room for the object being transferred by the transfer mechanism.

Figure 2:
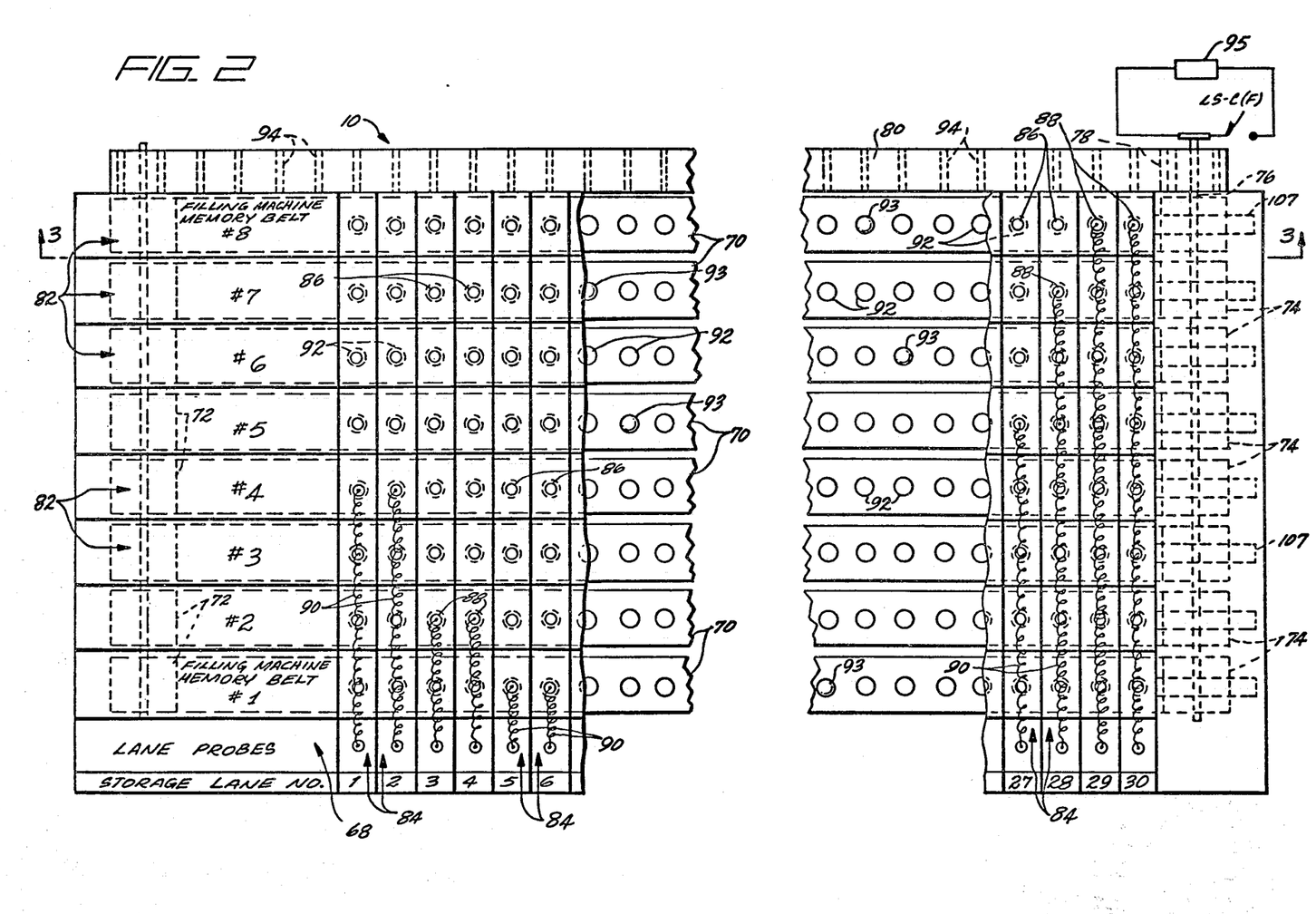
FIG. 2 is a fragmentary schematic plan view showing a matrix panel and memory bands for the sorting system.
Figure 3:
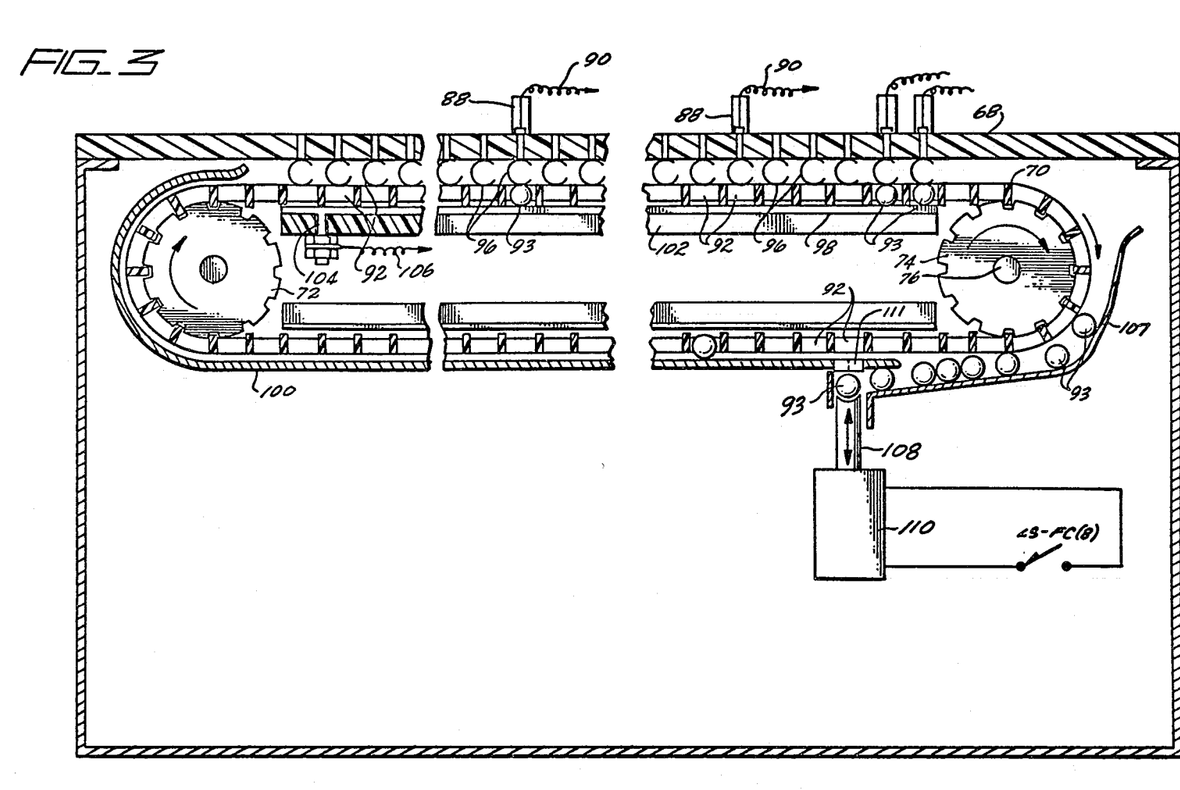
FIG. 3 is a fragmentary schematic elevation view taken on line 3—3 of FIG. 2.

The digital memory control unit 11 will be understood best by referring to FIGS. 2 and 3. The control unit includes a horizontally disposed control panel or matrix board 68 mounted over a series of side-by-side memory bands 70, there being one memory band associated with each filler unit 24. During operation of the control system the memory bands move in unison for a purpose described in detail below. The bands do not necessarily need to be physically separated from each other the way they are in FIG. 2. In fact, the set of bands may be replaced by a single wide band providing the equivalent function of the separate bands 70. This equivalency will be described in greater detail below. In the example shown in FIGS. 2 and 3, there are eight memory bands corresponding to the eight product filler units. FIG. 3 shows only the memory band associated with filler no. 8.

The memory bands can take many different forms. In the controller shown in FIGS. 2 and 3, the memory bands comprise separate, flexible endless rubber belts, each belt being engaged with a separate idler sprocket 72 at one end, and a separate drive sprocket 74 at the other end. The drive sprockets are engaged with elongated transverse drive shaft 76 which, in turn, is coupled to a drive sprocket 78 engaged with an endless drive belt 80 running parallel to, and being identical in length to, the memory bands. When a single wide belt is used, as described above, drive belt 80 may be secured by suitable fastenings to the memory belt so that both belts are always kept in unison to move exactly as one.

Matrix board 68 displays a grid, or matrix, shown best in FIG. 2. The grid is marked off in rows 82 and columns 84. In the example shown in FIG. 2 there are eight rows in the matrix, each row representing a separate one of the eight product filler units. There are thirty columns in the matrix, each column representing a different one of the thirty storage lanes where products of a given type can be selectively stored. Each row of the matrix is positioned above a corresponding one of the memory bands 70. Thus, each memory band traverses each of the thirty matrix columns representing the thirty storage lanes of the storage conveyor; and each of the 240 matrix squares on the control panel can represent a given product being stored at a given lane.

Control panel 68 includes a series of thirty matrix holes or memory cells 86 for each row 82 of the matrix. The matrix holes in each column 84 provide respective circuit inputs to receive a corresponding plug-in type circuit element such as an electrode or probe 88 associated with that particular column. There are thirty probes 88 on the control panel, one associated with each column 84 or storage lane 26. Each probe is coupled to a respective jumper wire 90 which is part of the electrical control circuitry to be described below in conjunction with FIG. 4.

Each memory band includes a series of longitudinally spaced apart holes or code-receiving storage locations 92. Holes 92 are adapted to receive digital memory information bits preferably in the form of round steel balls 93. A ball is inserted into a hole on a given memory band to provide a code representing the position of a stack of cases on the crossfeed conveyor.

A particular lane probe being plugged into a matrix hole 86 aligned with a coded memory band represents the particular storage lane where a product associated with the memory band is to be stored. Memory bands 70 are synchronized with the movement of crossfeed conveyor 14 so that each coded storage location of a given memory band will engage a preselected lane probe when the product associated with the coded memory band is advanced by the crossfeed conveyor to the storage lane represented by the lane probe. This is accomplished in the present system by making the memory belts more one space forward in unison each time the products on the crossfeed conveyor move forward one space or one index. The distance between holes 92 is exactly equal to the spacing of matrix holes 86. Moreover, drive belt 80 includes a series of longitudinally spaced apart transverse cogs 94 which are spaced apart by a distance identical to the spacing between matrix holes 86 and also the spacing between belt holes 92. Drive sprocket 78 is coupled to a ratchet solenoid represented schematically at 95. The ratchet solenoid is actuated by a limit switch LS-C(F) becoming closed, as will be further described below in conjunction with FIG. 4. The ratchet solenoid advances drive belt 80, and therefore memory bands 70, one hole space (in the direction of the arrows shown in FIG. 3) for each forward stroke of crossfeed conveyor 14. Thus, a given hole 92 in each memory band will advance from alignment with a matrix hole 86 associated with one storage lane 26 to alignment with a matrix hole associated with the next storage lane for each forward stroke of the crossfeed conveyor.

Figure 4:
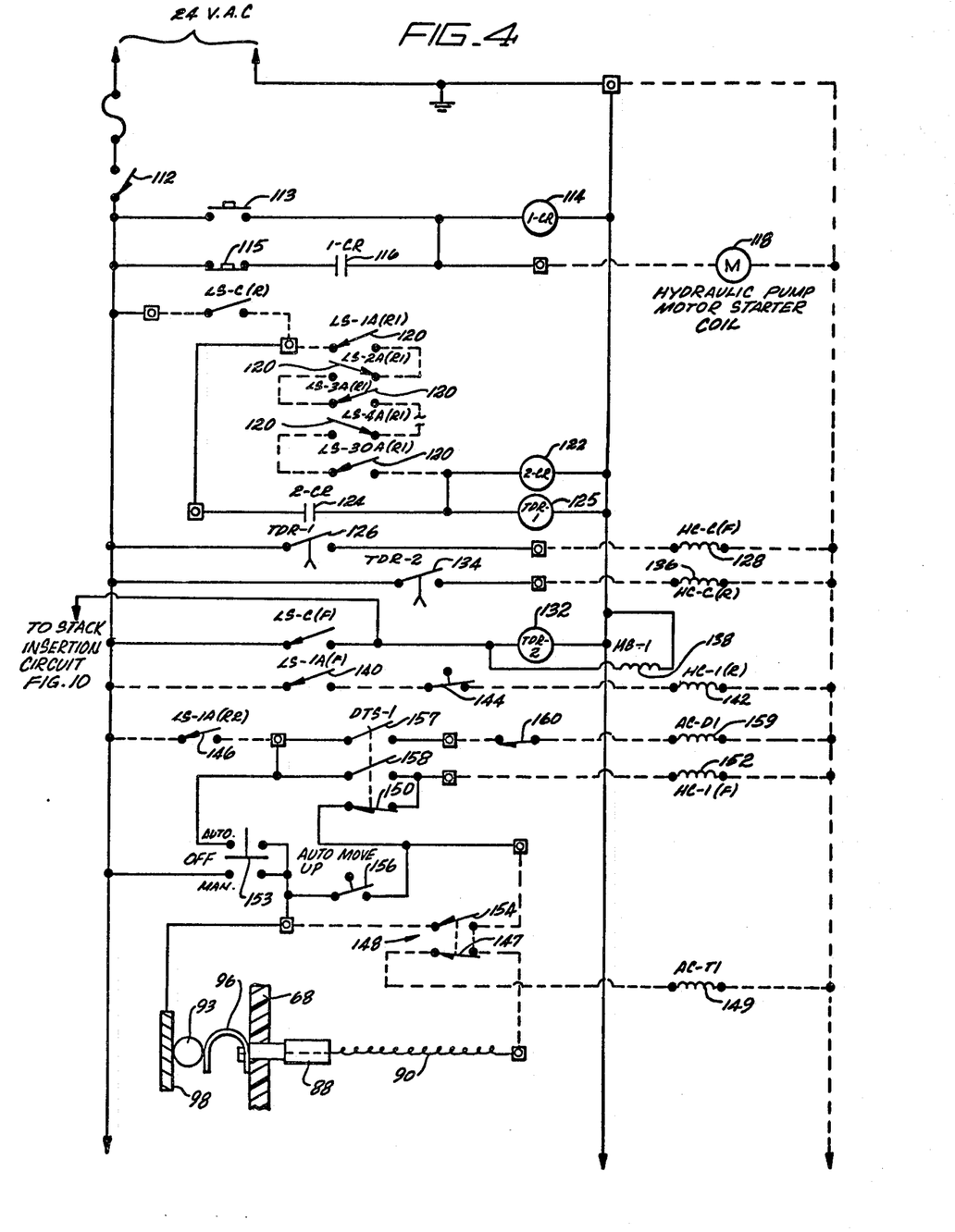
FIG. 4 is an electrical schematic diagram illustrating the operation of the sorting system.

In the instance where a single memory band is used, each line of holes 92 in the single band is equivalent to a separate one of the bands 70, and each row of holes will represent one of the individual product filler stations 24. If a large number of filler stations are used, requiring a very wide single belt with a large number of rows of holes 92, it may be desired to have drive belt 80 secured to both sides of the single memory belt so that the wide memory belt is driven in unison from both sides to keep the belt accurately aligned with matrix columns 84. A ball 93 is inserted into a hole in a given memory band when a product associated with the band is fed onto an empty space on crossfeed conveyor 14. The balls act as coded memory storage bits, or analogs for the products, and are advanced one space, or pitch, of the band each time the crossfeed conveyor moves one forward stroke. When the ball reaches an electrical probe 88 corresponding to a preselected storage lane where the product is to be stored, the ball engages an electrical contact 96 associated with the matrix hole in which the probe is plugged. This completes an electrical control circuit or decoding circuit which generates an output signal to automatically raise the transfer lugs of transfer mechanism 44 in preparation for pulling the product onto the storage lane. The operation of the control circuit will be described in greater detail below.

Balls 93 are held in the holes of their corresponding memory bands by respective elongated electrical current carrying buss bars 98 located below the top run of the belts, and by lower backup strips 100 located below the bottom run of the bands and at the idler pulley end of the memory belts. Each buss bar 98 is made of an electrically conductive material, and is supported by a backup bar 102 made of an electrical insulator such as nylon. A separate electrical contact 104 coupled with each buss bar projects through its respective backup bar 102, and is coupled to an electrical lead 106 which, in turn, is coupled to one terminal of a power supply which is part of the control circuit shown in FIG. 4 and described below.

FIG. 3 illustrates a preferred method for feeding balls 93 into the memory bands. Balls which have travelled almost a complete cycle of their respective memory bands drop from the bands by gravity and are retained by separate retriever strips 107 located below the lower run of their respective bands. The retrieved balls are fed by gravity onto a separate solenoid plunger 108 operated by a solenoid coil 110 associated with each memory band. Each solenoid coil 110 is respectively coupled to a limit switch (LS-FC(8) is shown in FIG. 3 for lane no. 8). The limit switch is closed when a stack of cases associated with its corresponding memory band is fed onto crossfeed conveyor 14 from the product filler lane 18. The detailed arrangement of the stack feeding mechanism will be described in detail below. Closing of the limit switch energizes solenoid coil 110 to push its corresponding solenoid plunger 108 upwardly to insert one of the previously retrieved balls into a hole in the memory band. Each ball is fed through a cherry pitter gasket 111 which holds the ball in the memory belt after plunger 108 has retracted.

The ball feeding mechanisms are located at different points along the lower run of their respective memory bands to correspond to the difference in distance of the respective filler lanes 18 from a given reference point on the crossfeed conveyor, i.e., the no. 1 storage lane 26. Thus, the ball feeding mechanism for product filler no. 1 injects balls into a hole located sixteen steps from the matrix hole corresponding to the no. 1 lane, the ball feeding mechanism for product filler no. 2 injects balls into a hole in memory belt no. 2 located twenty-two steps from the no. 1 storage lane matrix hole, and so forth.

The length of the closed loop memory bands must be such that they will be able to store information bits for subsequent read-out at any of the storage lanes where the product can be stored. Thus, the memory bands for the thirty-lane dairy plant 12 require fiftyfour holes, or code-receiving storage locations, for identifying a product travelling from product filler no. 8 to storage lane no. 1, plus twenty-nine holes for identifying a product travelling from lane no. 1 to lane no. 30, plus sufficient extra spaces to erase or eliminate the code established by each information bit, i.e., by dropping each ball 93 after it is used so that the holes in the band may be available to receive another information bit whenever another stack is fed onto the crossfeed conveyor.

The operation of the control circuitry for the analog memory system is understood best by referring to the plan view of FIG. 1 in conjunction with the electrical schematic diagram of FIG. 4 in which the solid lines represent wiring contained in control unit 10, and the dotted lines represent field wiring to the limit switches, etc. Further in the reference letters (R) represents the rear position of a given conveyor carriage, and (F) represents the forward position of a given conveyor carriage.

Operation of the control system is initiated by closing an ON-OFF switch 112 on control panel 11 to supply power from a 24 volt A.C. power supply (not shown). A normally open push button start switch 113 is then closed to energize a coil 114 of a control relay 1-CR. A holding circuit for coil 114 is completed through a normally closed stop button switch 115 and a normally open contact 116 of control relay 1-CR. Thus, relay coil 114 remains energized to supply power to a hydraulic pump motor starter coil 118 for supplying hydraulic fluid to several of the hydraulic cylinders included in the conveyor driving system, which will be described below. Switch 115 is opened to cut off power to relay coil 114 whenever it is desired to stop the hydraulic pump motor.

The operation of the crossfeed conveyor carriage 34 is controlled so it makes a forward stroke only when conveyor carriages 40 of storage lanes 26 are all in their rear positions. A limit switch LS-C positioned near the end of the crossfeed conveyor closes a contact LS-C(R) each time the crossfeed conveyor carriage is in its rear position. A series of limit switches LS-1A for storage lane no. 1, LS-2A for storage lane no. 2, and so forth, all of which are electrically wired in series, are automatically closed when the storage lane conveyor carriages 40 are in their rear positions. Limit switchs LS-1A, LS-2A, etc., are center-neutral type switches with two normally open pairs of contacts on each side of neutral. A first contact 120 of each switch is closed when the conveyor carriage is in its rear position. Contacts 120 are connected in series so that a coil 122 of a control relay 2-CR is energized only when the crossfeed conveyor carriage and all of the storage conveyor carriages are simultaneously in their rear positions. A normally open contact 124 of control relay 2-CR is closed when coil 122 is energized through switch LS-C(R) to supply power to a coil 125 of a time delay relay TDR-1. This holds switch 2-CR closed until switch LS-C(R) is opened. A normally open contact 126 of time delay relay TDR-1 automatically is closed preferably after a two-second time delay to supply power to a coil 128 of a solenoid valve which controls hydraulic cylinder HC-C. Energizing of coil 128 thus moves the spool of the hydraulic valve to cause the hydraulic cylinder of crossfeed conveyor 14 to extend its shaft and move the crossfeed conveyor carriage to its forward position, i.e., one forward stroke.

Figure 9:
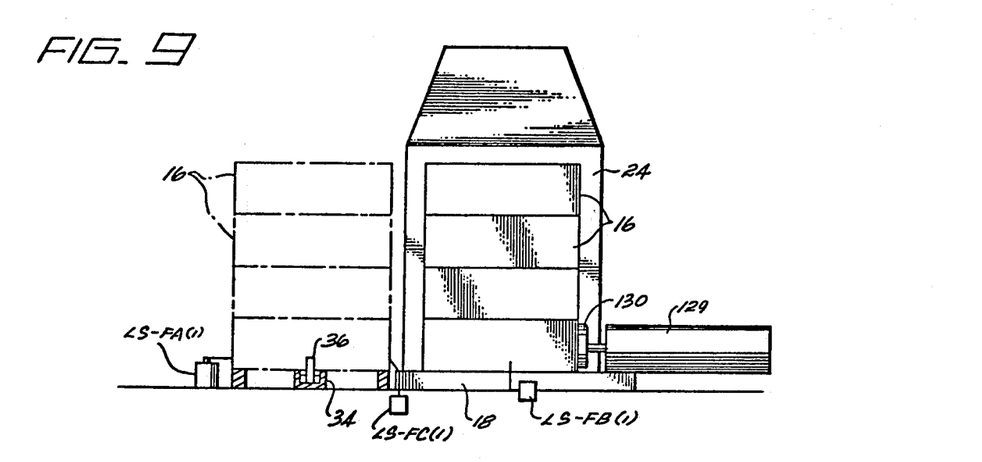
FIG. 9 is a schematic elevation view showing a stack inserter system for feeding objects onto the feed conveyor.
Figure 10:
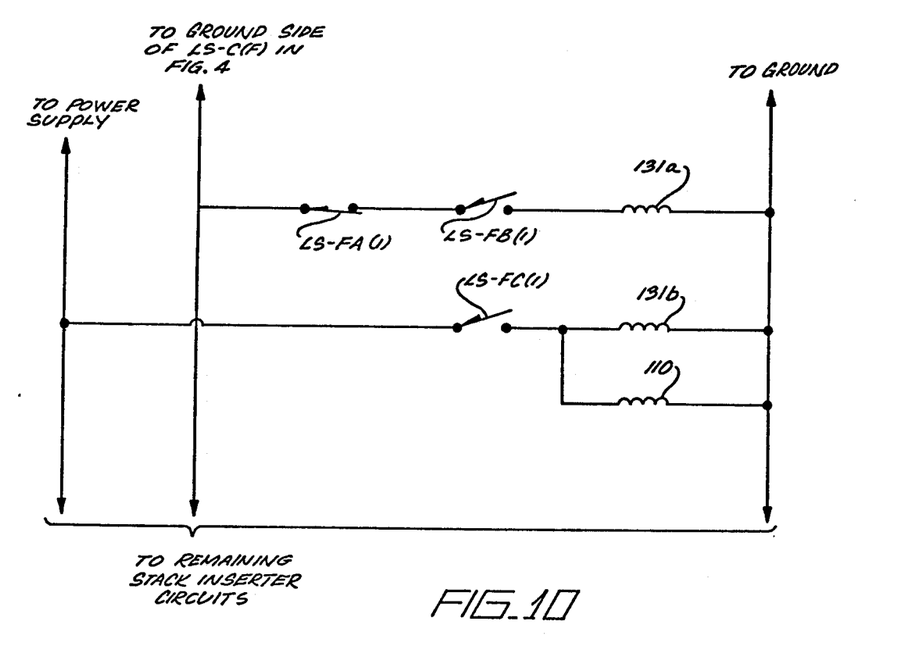
FIG. 10 is an electrical schematic diagram illustrating the operation of the stack inserter system.

At the time when the crossfeed conveyor carriage is in its forward position, the crossfeed conveyor track is capable of receiving a stack of cases discharged from product filler units 24. FIGS. 9 and 10 illustrate a system for controlling the feeding of stacks of cases onto the crossfeed conveyor from product filler units 24. For each product filler unit (the stack feeding system for filler unit no. 1 is shown in FIGS. 9 and 10), there is a separate air cylinder 129 having a movable plunger 130 for pushing stacks of cases from filler lane 18 onto the crossfeed conveyor track. Each stack is pushed onto the crossfeed conveyor only when an empty space is there to receive it, but not until the crossfeed conveyor carriage has reached the end of its forward stroke or during the return stroke of the crossfeed conveyor.

A limit switch LS-FA(1) located next to the crossfeed conveyor senses whether or not an open space is present on the crossfeed conveyor to receive a stack from filler lane 18. A limit switch LS-FB(1) located on the filler lane adjacent the product filler station senses whether or not a stack is ready to be fed onto the crossfeed conveyor from the filler lane. Limit switches LS-FA(1) and LS-FB(1) are connected in series with a valve coil 131a of air cylinder 129. Value coil 131a is energized to advance plunger 130 to push a stack forward only when limit switches LS-FA(1) and LS-FB(1) are both closed at the same time as limit switch LS-C(F) is closed. Limit switch LS-FA(1) is normally closed when an open space is present on the crossfeed conveyor track at the end of product input lane 18. If the space is occupied, the presence of the stack opens limit switch LS-FA(1) to prevent solenoid coil 131a from being energized. Thus, a stack on product input lane 18 will not be pushed into the stack then present on the crossfeed conveyor.

Limit switch LS-FB(1) is normally open as long as no stack of cases on product input lane 18 is ready to be fed onto the crossfeed conveyor track. When a stack of cases is ready to be fed onto the crossfeed conveyor, the presence of the stack on input lane 18 closes limit switch LS-FB(1) to advance plunger 130 and push the stack onto the crossfeed conveyor track only when limit switch LS-C(F) is closed at the end of the forward stroke of the crossfeed conveyor.

Limit switches LS-FA(1) and LS-FB(1), together with advance coil 131a, are connected in series to the ground side of limit switch LS-C(F) in the circuit shown in FIG. 4. This prevents random insertion of stacks onto the crossfeed conveyor. Limit switch LS-C(F) remains open during forward movement of the cross-feed conveyor and is closed only when the conveyor reaches the end of its forward stroke. Thus, plunger advance coil 131a can be energized to allow the plunger to start insertion of a stack only when the crossfeed conveyor has reached the end of its forward stroke. This prevents stacks from striking the pusher lugs of the crossfeed conveyor during insertion, and thereby jamming the conveyor. The stack may continue to be inserted during the return stroke of the crossfeed conveyor because lugs are down at that time.

A normally open limit switch LS-FC(1) positioned next to the crossfeed conveyor track closes when plunger 130 reaches the end of its forward stroke and completes pushing a stack onto the crossfeed conveyor track. When limit switch LS-FC(1) is closed it energizes a valve coil 131b of air cylinder 129 to retract plunger 130 in readiness for advancing the next stack of cases to be inserted onto the crossfeed conveyor. Closing of limit switch LS-FC(1) also energizes coil 110 of the ball insertion mechanism (described above for FIG. 3) to feed a ball 93 into the particular memory band 70 associated with the product being fed onto the crossfeed conveyor. Thus, each memory band is coded with an information bit each time the product with which it is associated is fed onto the crossfeed conveyor.

Other stack inserter circuits (not shown) for the remaining filler lanes are connected in parallel with the circuit shown in FIG. 10. Each of these circuits is connected through the lead from the ground side of limit switch LS-C(F) so that each feeding mechanism can be activated only when the crossfeed conveyor is in the forward position.

Referring again to FIG. 4, limit switch LS-C(F) closes when the crossfeed conveyor carriage reaches the end of its forward stroke to energize a coil 132 of a second time delay relay TDR-2. This closes a normally open relay contact 134 preferably after a one-second time delay to supply power to a coil 136 of the hydraulic cylinder valve causing hydraulic cylinder HC-C to retract the crossfeed conveyor carriage to its rear position.

Each time the crossfeed conveyor carriage reaches the end of its forward stroke, the closing of limit switch LS-C(F) also supplies power to a digital memory index coil 138 to automatically energize ratchet solenoid 95 to move the drive belt 80, and memory bands 70, one step to correspond to each forward stroke of the crossfeed conveyor.

The remaining part of electrical schematic diagram of FIG. 4 will be described in conjunction with circuitry associated with controlling memory band no. 1 and storage lane no. 1, since identical circuitry is repeated for each additional memory belt and storage lane used in the digital memory control system. When the conveyor carriage of storage lane no. 1 reaches its forward position, a normally open contact 140 of limit switch LS-1A is closed to supply power to a coil 142 of a hydraulic cylinder valve for a hydraulic cylinder HC-1 to return the lane no. 1 carriage to its rear position. This circuit also includes an optional manually operative toggle switch 144 which, when manually opened, will keep lane no. 1 carriage from retracting.

When the storage conveyor carriage reaches its rear position, a second normally open contact 146 of limit switch LS-1A is closed to complete a circuit through a normally closed contact 147 of a ganged switch 148 to supply power to a solenoid valve coil 149 of air cylinder AC-T1 of the storage lane transfer mechanism 44 (for storage lane no. 1). Contact 147 is located near the receiving end of the storage lane (see FIG. 1) to sense whether or not a stack is on the rear space of the storage lane conveyor. The switch remains closed as long as the rear space is unoccupied and therefore able to receive a stack transferred from the crossfeed conveyor. In this instance, when valve coil 149 is energized, piston arm 64 of transfer mechanism 44 will be extended to raise transfer lugs 48 in preparation for pulling a stack of cases onto the preselected storage lane. This circuit is completed only when a ball 93 in memory band 70 is moved into engagement with the electrical contact 96 of the probe 88 associated with the storage lane selected to store the product corresponding to the memory band.

The completion of the circuit by ball 93 also allows current to flow through a normally closed switch 150 to energize a valve coil 152 of a hydraulic cylinder HC-1 for moving the storage lane conveyor carriage one forward stroke. Movement of transfer mechanism 44 is keyed to movement of the storage lane conveyor, and therefore the raised transfer lugs 48 pull the stack from the crossfeed conveyor onto the rear space of the storage lane conveyor during the forward stroke of the storage lane carriage. The circuit for controlling the transfer of the stacks onto the storage lane is capable of being operated in either the manual or automatic mode depending upon the position of a switch 153.

A normally open contact 154 of ganged switch 148 closes when a stack is present in the rear space of the storage lane conveyor. When contact 154 closes, it completes a circuit to valve coil 152 through switch 150 to actuate hydraulic cylinder AC-1(F) to move the previously transferred stack into the second space on the storage lane conveyor. When contact 154 closes to indicate that a stack is present in the rear space of the storage conveyor, contact 147 automatically opens and will prevent the transfer lugs of transfer mechanism 44 from being able to pull a stack onto the rear space of the storage lane conveyor as long as the rear space remains occupied.

Since each stack fed onto the storage lane conveyor is moved to the second space of the storage lane due to the two strokes of the conveyor carriage, stacks will begin filling the storage lane conveyor with a space being present between each adjacent pair of stacks. When it is desired to move the stacks to the end of the storage lane in an end-to-end relation in preparation for discharging the stacks onto discharge conveyor 28, a normally open switch 156 can be manually closed to energize valve coil 150. This continuously reciprocates the storage lane conveyor carriage to move the stacks into an end-to-end relation at the end of the storage lane.

Contact 150 is part of the ganged switch DTS-1 which includes a pair of normally open contacts 157 and 158. Ganged switch DTS-1 is part of a stack discharge circuit which can automatically discharge stacks of cases from the end of the storage lane onto discharge conveyor 28 in a continuous operation. This is accomplished by manually closing contacts 157 and 158 which, in turn, automatically open contact 150. When contact 157 is closed, power is supplied to a valve coil 159 of an air cylinder AC-D1 which actuates a suitable mechanism (not shown) for holding pusher lugs 42 of the storage lane conveyor carriage in their operative nose-up positions. The closing of contact 158 allows valve coil 152 of cylinder HC-1(F) to be energized (each time that lane no. 1 returns to the rear position) through limit switch LS-1A (R2) to continuously reciprocate the storage lane conveyor carriage to discharge as many stacks of cases as desired onto the discharge track. The conveyor carriage of the discharge conveyor is operative in synchronism with storage lane conveyor carriage to move the discharged stacks down the discharge conveyor track toward the shipping area.

A normally closed switch 160 located at the end of the storage conveyor lane senses whether a stack is in position to be discharged properly onto the discharge conveyor track. The switch opens in the event a stack is not in proper position (at the end of lane no. 1) to be moved onto the discharge track, such as when a stack becomes askew or otherwise out of position. This cuts off power to valve coil 159, thereby preventing further continuation of the discharge operation.

Thus, the sorting operation for a production plant comprising several filling or product discharge stations and numerous storage lanes can be very simply programmed. A probe designating the lane where a particular product is to be stored is simply plugged into a control panel matrix board in a location corresponding to that particular storage lane and product. The memory bands associated with the respective products are coded with digital memory information bits which keep track of the position of each product as it travels to the storage lanes. When the product reaches the previously designated storage lane where it is to be stored, the information on the memory belt is decoded by the probe to energize a transfer mechanism for moving the product onto its designated storage lane.

Figures 7, 8:
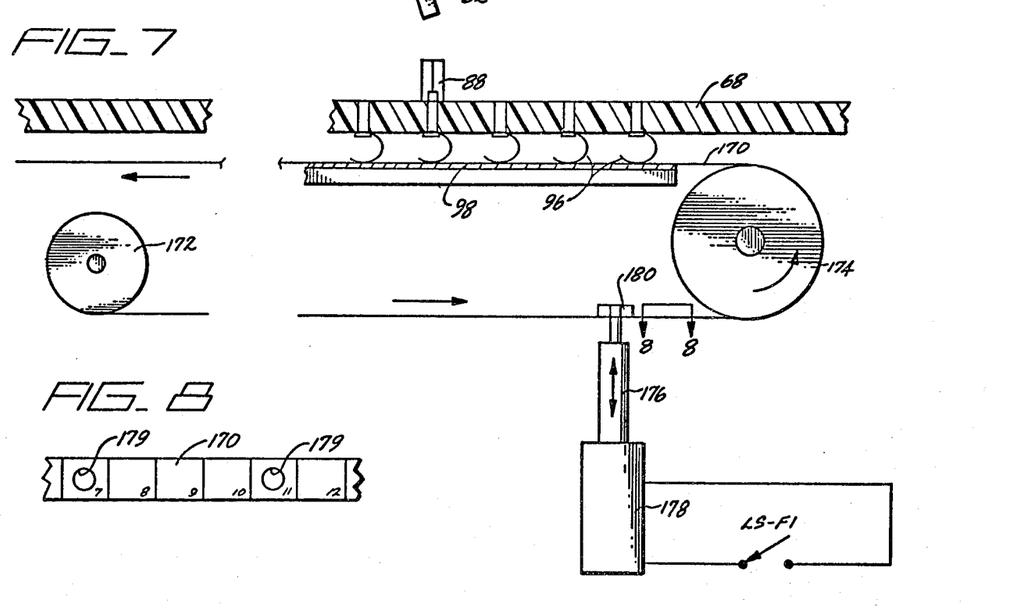
FIG. 7 is a fragmentary schematic elevation view showing an alternate embodiment of the digital memory system, in which a tape replaces the memory bands shown in FIGS. 2 and 3.
FIG. 8 is a fragmentary plan view taken on line 8–8 of FIG. 7.

The digital control memory system and its use in conjunction with dairy plant 12 are only one embodiment of many which can be used based on the principles of this invention. There are several alternative methods for carrying out the sorting operation of this invention without departing from the scope of this invention. For example, in reference to FIGS. 7 and 8, memory band 70 can be replaced with a paper tape 170 operated in an open loop fashion. The tape shown in FIGS. 7 and 8 is in an open loop configuration. Tape 170 is fed from a supply reel 172 around an idler drum 174 and then past electrical contacts 96 and probes 88 of matrix board 68. In this instance, the solenoid which inserts the memory balls into band 70 is replaced by a reciprocating punch 176 operated by a solenoid 178. The punch forms holes 179 in the tape, with the aid of a die 180, whenever a product is fed onto the crossfeed conveyor from the particular filler unit corresponding to the tape. In this instance, the circuit to the transfer mechanism 44 is completed through power buss 98 whenever a hole punched in the tape is indexed to a position under a probe 88. This provides the same signal as that provided by the memory bands 70, but the coded tape has the additional advantage of being able to store a permanent record of the day's production and storage.

In another embodiment (not shown) the paper tape can be replaced by open loop magnetic recording tape, and a signal can be recorded on the tape to mark the location of a given product travelling on the conveyor. A magnetic pickup head can replace the probes in the matrix board. This tape also can be stored on reels for a permanent record, or it can be used to feed information into a computer if desired.

In another embodiment, the magnetic tape may be in a closed loop system. In this instance, a magnetic erase head positioned in an appropriate location erases the signals previously recorded on the tape so that it may be continuously reused.

In a further embodiment, a reel of paper tape may be used as described in FIGS. 7 and 8, with the probe being replaced by a small electric eye so that when a hole in the tape is advanced to a position under the electric eye, a light shining through the hole in the tape activates the electric eye and sends an appropriate signal to the product transfer mechanism.

I claim:
1. A digital memory system comprising
   a. a plurality of movable memory bands;
   b. means for coding each memory band with information bits representing a predetermined memory condition for each memory band;
   c. a series of separate decoding circuits, each circuit being activated for decoding the memory condition of a selected coded memory band; and
   d. a programming unit for associating each decoding circuit with information bits in a selected one of any of the memory bands, the programming unit including a matrix of circuit input means arranged to provide a separate series of said input means in circuit connection with each decoding circuit, the several input means in each series being associated with corresponding ones of the memory bands; and a series of separate movable circuit elements, each circuit element being in circuit connection with a separate one of the decoding circuits, each circuit element also being removably connectible to any one of the several input means associated with the decoding circuit to which the circuit element is connected for selectively decoding any of the memory bands, the information bits traveling on a selected memory band cooperating with the circuit element being connected to the input means associated with the selected memory band to activate the decoding circuit which thereby decodes the memory band.

2. A digital memory system according to claim 1 in which the information bits comprise separate electrically conductive members; the memory bands comprise endless belts each having a series of spaced apart, individual receptacle means for holding respective ones of the electrically conductive members; and each circuit element is a movable electrode, each electrically conductive member cooperating with a given electrode to complete an electrical circuit for activating the decoding circuit associated with the given electrode.

3. A digital memory system according to claim 1 in which the programming unit comprises a matrix panel having a matrix of input receptacles therein, a separate row of spaced apart receptacles being associated with each memory band, individual sets of receptacles in the rows being arranged in separate columns of spaced apart receptacles, each column being associated with a separate one of the circuit elements, each circuit element being removably connectible to an input receptacle associated with a given column and row to selectively activate the decoding circuit associated with the given column to decode information bits in the memory band associated with the given row.

4. A digital memory system according to claim 3 including information bits which comprise separate electrically conductive members; the memory bands comprise endless belts each having a series of spaced apart, individual receptacle means for holding respective ones of the electrically conductive members; and each circuit element is a movable electrode, each electrically conductive member cooperating with a given electrode to complete an electrical circuit for activating the decoding circuit associated with the given electrode.

5. A digital memory system according to claim 4 in which the matrix panel is disposed adjacent the endless belts so that each row of input receptacles is aligned longitudinally with a separate one of the endless belts, and each column of input receptacles is aligned with a corresponding electrode.

6. A digital memory system according to claim 1 in which the memory bands comprise separate tapes, and the information bits provided by the coding means are separate holes punched in each tape; and including means adjacent each tape to activate each decoding circuit when its associated circuit element is aligned with a hole in a given tape.

7. A digital memory system comprising:
   a. a plurality of movable memory bands;
   b. means for coding each memory band with information bits at longitudinally spaced apart locations on the memory band to represent a predetermined memory condition for each memory band;
   c. a series of seperate decoding circuits, each circuit being activated for decoding the memory condition of a selected one of the coded memory bands; and
   d. a programming unit for associating each decoding circuit with information bits in a selected one of any of the memory bands, the programming unit including
      1. a control panel having an array of individual spaced apart circuit input means arranged on the panel in a matrix of rows and columns, each column having a series of said input means in circuit connection with a respective decoding circuit, the individual input means in a given column being associated with corresponding ones of the memory bands; each row having spaced apart circuit input means associated with a respective memory band, the individual input means in a given row being associated with corresponding ones of said longitudinally spaced apart locations on the memory bands; and
      2. a series of separate movable circuit elements, each circuit element being in circuit connection with a separate one of the decoding circuits, each circuit element also being associated with a given column of circuit input means and being removably connectible to any one of the circuit input means in said column for selectively decoding the memory condition of any of the memory bands, the information bits traveling on a selected memory band cooperating with a given circuit element being connected to the circuit input means of the row associated with that selected memory band to selectively activate the decoding circuit associated with that given circuit element to decode the memory condition of the memory band.

8. A digital memory system according to claim 7 in which the information bits comprise separate electrically conductive members; the memory bands comprise endless belts each having a series of spaced apart, individual receptacle means for holding respective ones of the electrically conductive members; and each circuit element is a movable electrode for being placed in contact with a given column of circuit input means, each electrically conductive member cooperating with a given electrode to complete an electrical circuit for activating the decoding circuit associated with the given electrode.

9. A digital memory system according to claim 8 in which the control panel is disposed adjacent the endless belts so that each row of circuit input means is aligned longitudinally with a separate one of the endless belts, and each column of circuit input means is aligned with a corresponding electrode, said electrical circuit being activated by a corresponding electrode contacting an associated electrically conductive member when the belt moves the member into the alignment with the circuit input means in contact with said electrode.

10. A digital memory system comprising:
    a. a plurality of movable memory bands each having a series of longitudinally spaced apart locations for receiving respective information bits;
    b. means for coding each memory band by placing information bits in selected ones of said spaced apart locations to represent a predetermined memory condition for each memory band;
    c. a series of separate decoding circuits, each circuit being activated for decoding the memory condition of a selected one of the coded memory bands;
    d. a programming unit for associating each decoding circuit with information bits in a selected one of any of the memory bands, the programming unit including
       1. a control panel having an array of individual spaced apart circuit input means arranged on the panel in a matrix of rows and columns, each column having a series of said input means in circuit connection with a respective decoding circuit, the individual input means in a given column being associated with corresponding ones of the memory bands; each row having spaced apart circuit input means associated with a respective memory band, the individual input means in a given row being associated with corresponding ones of said longitudinally spaced apart locations on the memory band; and
       2. a series of separate movable electrodes, each electrode being in electrical circuit connection with a separate one of the decoding circuits, each electrode also being associated with a given column of circuit input means and being removably connectible to any one of the circuit input means in said column for selectively decoding the memory condition of any one of the memory bands, the information bits traveling on a selected memory band cooperating with a given electrode being connected to the circuit input means of the row associated with that selected memory band to complete an electrical circuit for selectively activating the decoding circuit associated with that given electrode to decode the memory condition of the memory band.

11. A digital memory system according to claim 10 in which the information bits comprise separate electrically conductive members; and each memory band has a series of spaced apart individual receptacle means for holding respective ones of the electrically conductive members.

12. A digital memory system according to claim 11 in which the control panel is disposed adjacent the movable memory bands so that each row of circuit input means is aligned longitudinally with a separate one of the memory bands, and each column of circuit input means is aligned with a corresponding electrode, said electrical circuit being activated by a corresponding electrode contacting an associated electrically conductive member when the belt moves the member into alignment with the circuit input means in contact with said electrode.

\* \* \* \* \*

UNITED STATES PATENT AND TRADEMARK OFFICE
CERTIFICATE OF CORRECTION

PATENT NO. : 3,961,163
DATED : June 1, 1976
INVENTOR(S) : CLARENCE H. STEVENSON, III It is certified that error appears in the above-identified patent and that said Letters Patent are hereby corrected as shown below:

Col. 1, line 13, "digital" should read --programmable digital/analog -- line 25, "off" should read -- of --

Col. 3, line 16, "articlesorting" should read -- article-sorting --

Col. 6, line 37, "made" should read -- make --

Col. 7, line 46, "more" should read -- move --

Col. 9, line 8, "fiftyfour" should read -- fifty-four -- line 53, "switchs" should read -- switches --

Col. 10, line 30, "Value" should read -- Valve --

Col. 12, line 15, "storae" should read -- storage - line 44, "the" should read -- a --

Col. 16, line 4, delete "the" (third occurrence)
(Claim 9)

Signed and Sealed this

Seventh Day of September 1976

[SEAL]

Attest:

RUTH C. MASON
*Attesting Officer*

C. MARSHALL DANN
*Commissioner of Patents and Trademarks*